United States Patent
Kim et al.

(10) Patent No.: US 10,983,835 B2
(45) Date of Patent: Apr. 20, 2021

(54) APPARATUS AND METHOD FOR SETTING ALLOCATION RATE OF PARALLEL-COMPUTING ACCELERATOR

(71) Applicant: ELECTRONICS AND TELECOMMUNICATIONS RESEARCH INSTITUTE, Daejeon (KR)

(72) Inventors: Chei-Yol Kim, Sejong (KR); Young-Ho Kim, Daejeon (KR); Jin-Ho On, Sejong (KR); Su-Min Jang, Sejong (KR); Gyu-Il Cha, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 9 days.

(21) Appl. No.: 16/658,748

(22) Filed: Oct. 21, 2019

(65) Prior Publication Data

US 2020/0183746 A1  Jun. 11, 2020

(30) Foreign Application Priority Data

Dec. 5, 2018 (KR) .......... 10-2018-0155432
Apr. 30, 2019 (KR) .......... 10-2019-0050760

(51) Int. Cl.
*G06F 9/50* (2006.01)
*G06F 17/18* (2006.01)
*H04L 29/08* (2006.01)

(52) U.S. Cl.
CPC ........... *G06F 9/505* (2013.01); *G06F 17/18* (2013.01); *G06F 2209/508* (2013.01); *H04L 67/125* (2013.01)

(58) Field of Classification Search
CPC ..................................................... G06F 9/505
See application file for complete search history.

(56) References Cited

U.S. PATENT DOCUMENTS

| | | | |
|---|---|---|---|
| 7,904,894 B2 * | 3/2011 | Entin | G06F 11/3476 717/151 |
| 8,620,091 B2 | 12/2013 | Choi | |
| 9,454,401 B2 | 9/2016 | Kim et al. | |
| 10,133,597 B2 | 11/2018 | Tian et al. | |

(Continued)

FOREIGN PATENT DOCUMENTS

| KR | 20130087257 A | 8/2013 |
|---|---|---|
| KR | 20180125734 A | 11/2018 |

*Primary Examiner* — Charlie Sun

(57) ABSTRACT

Disclosed herein are an apparatus and method for setting the allocation rate of a parallel-computing accelerator. The method includes monitoring the utilization rate of the parallel-computing accelerator by an application and setting a start point, at which measurement of utilization data to be used for setting the allocation rate of the parallel-computing accelerator for the application is started, using the result of monitoring the utilization rate; setting an end point, at which the measurement of the utilization data is finished, based on the monitoring result; and setting the allocation rate of the parallel-computing accelerator using the utilization data measured during a time period from the start point to the end point.

20 Claims, 6 Drawing Sheets

(56) References Cited

U.S. PATENT DOCUMENTS

| | | | |
|---|---|---|---|
| 2011/0138385 A1* | 6/2011 | Schmelter | G06F 11/32 718/1 |
| 2012/0124136 A1 | 5/2012 | Kim et al. | |
| 2018/0165579 A1 | 6/2018 | Friel et al. | |
| 2018/0336076 A1 | 11/2018 | Lim et al. | |

* cited by examiner

APPARATUS AND METHOD FOR SETTING ALLOCATION RATE OF PARALLEL-COMPUTING ACCELERATOR

CROSS REFERENCE TO RELATED APPLICATIONS

This application claims the benefit of Korean Patent Application No. 10-2018-0155432, filed Dec. 5, 2018, and No. 10-2019-0050760, filed Apr. 30, 2019, which are hereby incorporated by reference in their entireties into this application.

BACKGROUND OF THE INVENTION

1. Technical Field

The present invention relates generally to cloud-computing technology, and more particularly to technology for providing application services based on parallel-computing accelerators in a cloud environment.

2. Description of the Related Art

A server-computing field including high-performance computing is moving from an on-premise environment, in which companies maintain their own servers, to a cloud-computing environment. Cloud computing provides better performance in terms of scalability, which is regarded as the biggest obstacle in server computing, and has an advantage in that the effort and expense involved in server construction can be fully focused on service logic itself. The cloud-computing field is also rapidly changing from Infrastructure-as-a-Service (IaaS) or Platform-as-a-Service (PaaS), which provides service based on a virtual machine, to microservice architecture or serverless computing, which provides service based on program logic.

The high-performance computing field for providing high-performance parallel-computing capabilities is also rapidly changing from existing CPU-based architecture to architecture based on a parallel-computing accelerator. As a representative example of parallel-computing accelerators, there is General-Purpose computing on Graphics Processing Units (GPGPU) (hereinafter, a parallel-computing accelerator is referred to as a 'GPU').

As server-computing and high-performance computing paradigms are changed as described above, a high-performance cloud-computing environment supporting the use of GPUs is required.

Nowadays, deep-learning applications (including machine learning) are actively being researched and developed as high-performance computing applications based on GPUs, and these applications are applied in various kinds of services. Unlike a CPU, which enables dynamic scheduling, it is difficult for a GPU to support dynamic scheduling due to the processing characteristics thereof, and most cloud services based on GPUs support only static scheduling. Due to the characteristics of static scheduling, inappropriate scheduling may adversely affect the response time of applications and the efficiency of a system, and a schedule cannot be modified once it is made.

Various studies are underway in order to provide efficient scheduling. As representative examples, a method for reflecting GPU usage, which is detected by analyzing the source code of an application, to scheduling, a method for predicting long-term GPU usage based on the result of execution of an application for a short time, and the like are known.

Meanwhile, Korean Patent Application Publication No. 10-2013-0087257, titled "Method and apparatus for GPU resource allocation" discloses a method and apparatus for efficiently allocating the resources of a GPU.

SUMMARY OF THE INVENTION

An object of the present invention is to set an appropriate allocation rate for a parallel-computing accelerator depending on the result of execution of a short test and to support efficient GPU scheduling based thereon.

Another object of the present invention is to predict the usage pattern of a parallel-computing accelerator for running an application and to detect the total system load.

In order to accomplish the above objects, a method for setting an allocation rate of a parallel-computing accelerator, performed by an apparatus for setting the allocation rate of the parallel-computing accelerator, according to an embodiment of the present invention includes monitoring the utilization rate of the parallel-computing accelerator by an application and setting a start point, at which measurement of utilization data to be used in order to set the allocation rate of the parallel-computing accelerator for the application is started, using the result of monitoring the utilization rate; setting an end point, at which the measurement of the utilization data is finished, based on the monitoring result; and setting the allocation rate of the parallel-computing accelerator using the utilization data measured during a time period from the start point to the end point.

Here, setting the start point may be configured to set multiple time sections in the monitoring result, to determine whether a steady state is satisfied using utilization rates measured in the multiple time sections, and to set any one point included in the multiple time sections determined to correspond to the steady state as the start point.

Here, setting the start point may be configured to calculate the mean and the standard deviation of the utilization rates using the utilization rates measured in each of the multiple time sections and to determine whether the steady state is satisfied using the mean and the standard deviation of the utilization rates.

Here, a second time section may be adjacent to a first time section included in the multiple time sections, and the second time section may include part of a section starting from the end point of the first time section.

Here, setting the start point may be configured to determine that the steady state is satisfied in the multiple time sections when the difference between the maximum value and the minimum value of the means calculated in the multiple time sections and the difference between the maximum value and the minimum value of the standard deviations calculated in the multiple time sections are less than preset values.

Here, setting the end point may be configured to set multiple time sections in the monitoring result, to calculate the mean and the standard deviation of the utilization rates using the utilization rates measured in each of the multiple time sections, and to set any one point included in the multiple time sections as the end point using the mean and the standard deviation of the utilization rates.

Here, setting the end point may be configured to change the time spans of the multiple time sections when the difference between the maximum value and the minimum value of the means calculated in the multiple time sections and the difference between the maximum value and the minimum value of the standard deviations calculated in the multiple time sections are equal to or greater than preset values, and to calculate the mean and the standard deviation of the utilization rates using the utilization rates measured in each of the multiple time sections having the changed time spans.

Here, setting the end point may be configured to set any one point included in the multiple time sections as the end point when the difference between the maximum value and the minimum value of the means calculated in the multiple time sections and the difference between the maximum value and the minimum value of the standard deviations calculated in the multiple time sections are less than the preset values.

Here, setting the allocation rate may be configured to set multiple utilization coverage ranges for ensuring a utilization rate required by the application, to calculate the coverage values of the multiple utilization coverage ranges based on the utilization data, and to select any one of the multiple utilization coverage ranges.

Here, setting the allocation rate may be configured to set multiple coverage ranges for the allocation rate of the parallel-computing accelerator in order to ensure a utilization rate required by the application, to select any one of the coverage ranges by calculating coverage values for the multiple coverage ranges and the utilization data, and to set an allocation rate corresponding to the selected coverage range as a final allocation rate.

Here, setting the allocation rate may be configured to calculate the largest utilization rate included in utilization data included in each of the multiple coverage ranges as the coverage value of the coverage range, to compare the coverage values of the multiple coverage ranges with each other, and to set the allocation rate corresponding to any one of the multiple coverage ranges as the final allocation rate.

Here, setting the allocation rate may be configured to compare a first coverage value of the multiple coverage ranges with a second coverage value thereof, to select a coverage range corresponding to the second coverage value when the first coverage value is greater than the second coverage value and the difference therebetween is greater than a preset value, and to set an allocation rate corresponding to the selected coverage range as the final allocation rate.

Here, setting the allocation rate may be configured to compare the first coverage value of the multiple coverage ranges with the second coverage value thereof, to select a coverage range corresponding to the first coverage value when the first coverage value is greater than the second coverage value and the difference therebetween is equal to or less than the preset value, and to set an allocation rate corresponding to the selected coverage range as the final allocation rate.

Also, in order to accomplish the above objects, an apparatus for setting an allocation rate of a parallel-computing accelerator according to an embodiment of the present invention includes one or more processors; and executable memory for storing at least one program executed by the one or more processors. The at least one program may be configured to monitor a utilization rate of the parallel-computing accelerator by an application, to set a start point, at which measurement of utilization data to be used in order to set the allocation rate of the parallel-computing accelerator for the application is started, using the result of monitoring the utilization rate, to set an end point, at which the measurement of the utilization data is finished, based on the monitoring result, and to set the allocation rate of the parallel-computing accelerator using the utilization data measured during a time period from the start point to the end point.

Here, the at least one program may set multiple time sections in the monitoring result, determine whether a steady state is satisfied using utilization rates measured in the multiple time sections, and set any one point included in the multiple time sections determined to correspond to the steady state as the start point.

Here, the at least one program may set multiple time sections in the monitoring result, calculate the mean and the standard deviation of the utilization rates using the utilization rates measured in each of the multiple time sections, and set any one point included in the multiple time sections as the end point using the mean and the standard deviation of the utilization rates.

Here, the at least one program may set multiple coverage ranges for the allocation rate of the parallel-computing accelerator for ensuring a utilization rate required by the application, select any one of the multiple coverage ranges by calculating coverage values for the multiple coverage ranges and the utilization data, and set an allocation rate corresponding to the selected coverage range as a final allocation rate.

Here, the at least one program may calculate the largest utilization rate included in the utilization data included in each of the multiple coverage ranges as the coverage value thereof, compare the coverage values of the multiple coverage ranges with each other, and set the allocation rate corresponding to the any one of the multiple coverage ranges as the final allocation rate.

Here, the at least one program may compare a first coverage value of the multiple coverage ranges with a second coverage value thereof, select a coverage range corresponding to the second coverage value when the first coverage value is greater than the second coverage value and the difference therebetween is greater than a preset value, and set an allocation rate corresponding to the selected coverage range as the final allocation rate.

Here, the at least one program may compare the first coverage value of the multiple coverage ranges with the second coverage value thereof, select a coverage range corresponding to the first coverage value when the first coverage value is greater than the second coverage value and the difference therebetween is equal to or less than the preset value, and set an allocation rate corresponding to the selected coverage range as the final allocation rate.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
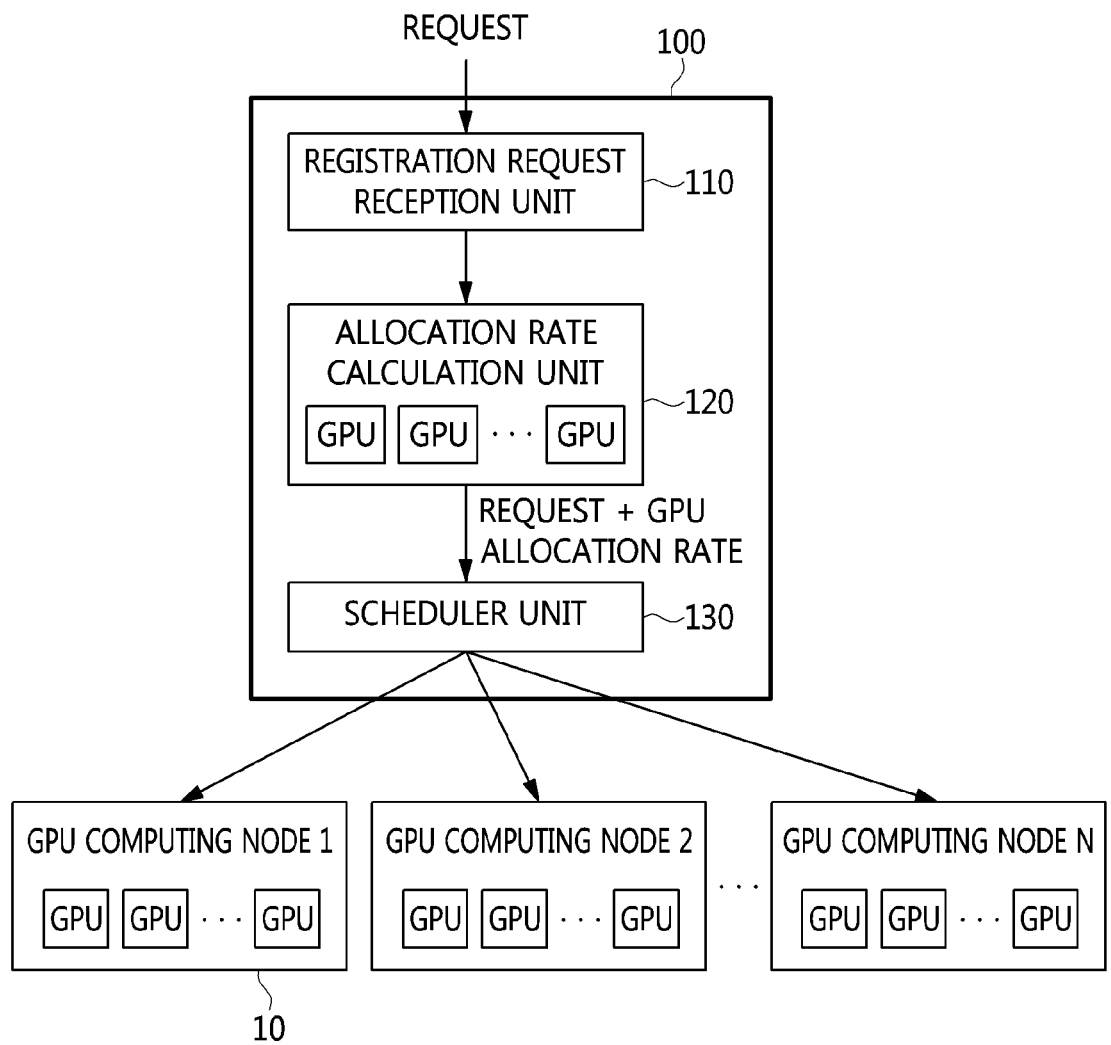
FIG. 1 is a block diagram that shows an apparatus for setting the allocation rate of a parallel-computing accelerator in a cloud-computing service environment based on GPUs according to an embodiment of the present invention.

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present invention will be described in detail with reference to the accompanying drawings.

When a request to run an application that takes a long time to run, such as a deep-learning application, is received in a GPU-based cloud-computing environment, a system is required to select the node to be allocated for the application and set a GPU allocation rate at the node in order to process the request. This process is referred to as 'GPU scheduling' or 'task scheduling'. In the present invention, when a deep-learning application, which takes a long time to run, is registered, the amount of GPU usage required for running the deep-learning application is determined through a short-term test before scheduling, and a GPU allocation rate that is set based thereon may be assigned to the application.

Figure 2:
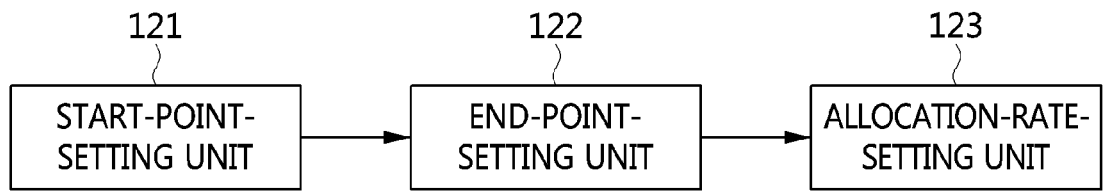
FIG. 2 is a block diagram that specifically shows an example of the allocation rate calculation unit illustrated in FIG. 1.

FIG. 1 is a block diagram that shows an apparatus for setting the allocation rate of a parallel-computing accelerator in a cloud-computing service environment based on GPUs according to an embodiment of the present invention. FIG. 2 is a block diagram that shows an example of the allocation rate calculation unit illustrated in FIG. 1.

FIG. 1 shows the overall system configuration and operation in a cloud-computing service environment based on GPUs according to an embodiment of the present invention. As shown in FIG. 1, in response to a request for a GPU computing node from an application, the apparatus 100 for setting the allocation rate of a parallel-computing accelerator allocates a GPU computing node 10 for running the application, thereby running the application.

Here, the GPU computing node 10 may include a CPU, memory, a disk and the like, like a general computing node.

Here, the GPU computing node 10 may be included in examples of the parallel-computing accelerator. Also, General-Purpose computing on Graphics Processing Units (GPGPU), Graphics Processing Units (GPU), and the like may be included in examples of the parallel-computing accelerator (hereinafter, the parallel-computing accelerator may be referred to as a 'GPU').

Here, the apparatus 100 for setting the allocation rate of a parallel-computing accelerator according to an embodiment of the present invention may include a registration request reception unit 110, an allocation rate calculation unit 120, and a scheduler unit 130.

The registration request reception unit 110 may receive a request for running an application, such as a deep-learning application or the like.

Here, the registration request reception unit 110 may register a task for running the application by setting the allocation rate of a parallel-computing accelerator.

Here, the registration request reception unit 110 may request or perform an initialization process through a test run of a deep-learning application or the like.

The allocation rate calculation unit 120 calculates a suitable allocation rate of the GPU computing node 10 before the task for running the deep-learning application is scheduled, thereby setting the allocation rate of the GPU computing node 10.

The scheduler unit 130 enables a task scheduler to perform scheduling for the GPU computing nodes 10 based on the set allocation rate.

A deep-learning application according to an embodiment of the present invention may include a training process for creating a model and an inference process for making predictions using the created model. The deep-learning application performs training through iterative parallel computation performed on a large amount of data, thereby creating a model for minimizing errors. Due to this characteristic, the deep-learning application may include periodic iterations of parallel computation.

Based on the repeatability of GPU utilization resulting from the iterative parallel computation performed in the deep-learning application, the present invention may predict GPU utilization for the deep-learning application, which takes a long time to run, through a short test run and calculate a GPU allocation rate using the values measured through the short test run in order to avoid the degradation of deep-learning performance and to increase system utilization.

The deep-learning application may include an initialization process, a repeated calculation process, and a final model creation process. The initialization process may include loading training data and initializing a system. Because the GPU utilization in the initialization process is different from that in the repeated calculation process and because the initialization process is very short compared to the repeated calculation process, there is no need to reflect the GPU utilization measured in the initialization process in the calculation of the GPU allocation rate. Also, because the model creation process, which is finally performed in the training process, is also very short, compared to the entire training process, there is no need to reflect the GPU utilization measured in the model creation process in the calculation of the GPU allocation rate.

Accordingly, the present invention sets the time at which the repeated calculation is started after the process of initializing the deep-learning application as a start point and detects the GPU utilization rate while one iteration of the calculation is performed, thereby setting the GPU allocation rate for the deep-learning application based thereon.

In order to set the GPU allocation rate for the deep-learning application, the present invention includes three steps. The first step is detecting the end time of the initialization process, which is excluded from measurement of GPU utilization, and setting a start point, at which measurement of GPU utilization is to be started. The second step is setting an end point, at which the measurement is to be finished. The final step is setting an allocation rate based on the measured utilization data.

Referring to FIG. 2, the allocation rate calculation unit 120 illustrated in FIG. 1 may include a start-point-setting unit 121, an end-point-setting unit 122, and an allocation-rate-setting unit 123.

The start-point-setting unit 121 may monitor the utilization rate of a parallel-computing accelerator used for an application, and may set a start point, at which measurement of utilization data to be used for setting the allocation rate of the parallel-computing accelerator for the corresponding application is started, using the result of monitoring the utilization rate.

Here, the start-point-setting unit 121 may set multiple time sections in the monitoring result, determine whether a steady state is satisfied using the utilization rates measured in the multiple time sections, and set any one point included in the multiple time sections determined to correspond to the steady state as the start point.

Here, the start-point-setting unit 121 may calculate the mean and standard deviation of utilization rates using the utilization rates measured in each of the multiple time sections and determine whether the steady state is satisfied using the mean and the standard deviation of the utilization rates.

Here, a second time section, which is adjacent to a first time section included in the multiple time sections, may include part of a section that starts from the end point of the first time section.

Here, the start-point-setting unit 121 may determine that the steady state is satisfied in the multiple time sections when the difference between the maximum value and the minimum value of the means calculated in the multiple time sections and the difference between the maximum value and the minimum value of the standard deviations calculated in the multiple time sections are less than preset values.

The end-point-setting unit 122 may set the end point, at which measurement of the utilization data is finished, based on the monitoring result.

Here, the end-point-setting unit 122 may set multiple time sections in the monitoring result, calculate the mean and the standard deviation of the utilization rates using the utilization rates measured in each of the multiple time sections, and set any one point included in the multiple time sections as the end point using the mean and the standard deviation of the utilization rates.

Here, the end-point-setting unit 122 may change the time spans of the multiple time sections when the difference between the maximum value and the minimum value of the means calculated in the multiple time sections and the difference between the maximum value and the minimum value of the standard deviations calculated in the multiple time sections are equal to or greater than preset values, and may calculate the mean and the standard deviation of the utilization rates using the utilization rates measured in each of the multiple time sections having the changed time spans.

Here, the end-point-setting unit 122 may set any one point included in the multiple time sections as the end point when the difference between the maximum value and the minimum value of the means calculated in the multiple time sections and the difference between the maximum value and the minimum value of the standard deviations calculated in the multiple time sections are less than the preset values.

The allocation-rate-setting unit 123 may set the allocation rate of the parallel-computing accelerator using the utilization data measured during a time period from the start point to the end point.

Here, the allocation-rate-setting unit 123 may set multiple utilization coverage ranges for ensuring the utilization rate required by the application, calculate the coverage values of the multiple utilization coverage ranges based on the utilization data, and select any one of the multiple utilization coverage ranges.

Here, the allocation-rate-setting unit 123 may set multiple coverage ranges for the allocation rate of the parallel-computing accelerator for ensuring the utilization rate required by the application, calculate coverage values for the multiple coverage ranges and the utilization data, select any one coverage range, and set the allocation rate corresponding to the selected coverage range as the final allocation rate.

Here, the allocation-rate-setting unit 123 may calculate the largest utilization rate included in the utilization data included in each of the multiple coverage ranges as the coverage value thereof, compare the coverage values of the multiple coverage ranges with each other, and set the allocation rate corresponding to any one coverage range as the final allocation rate.

Here, the allocation-rate-setting unit 123 may compare the first coverage value of the multiple coverage ranges with the second coverage value thereof, select the coverage range corresponding to the second coverage value when the first coverage value is greater than the second coverage value and the difference therebetween is greater than a preset value, and set the allocation rate corresponding to the selected coverage range as the final allocation rate.

Here, the allocation-rate-setting unit 123 may compare the first coverage value of the multiple coverage ranges with the second coverage value thereof, select the coverage range corresponding to the first coverage value when the first coverage value is greater than the second coverage value and the difference therebetween is equal to or less than the preset value, and set the allocation rate corresponding to the selected coverage range as the final allocation rate.

Figure 3:
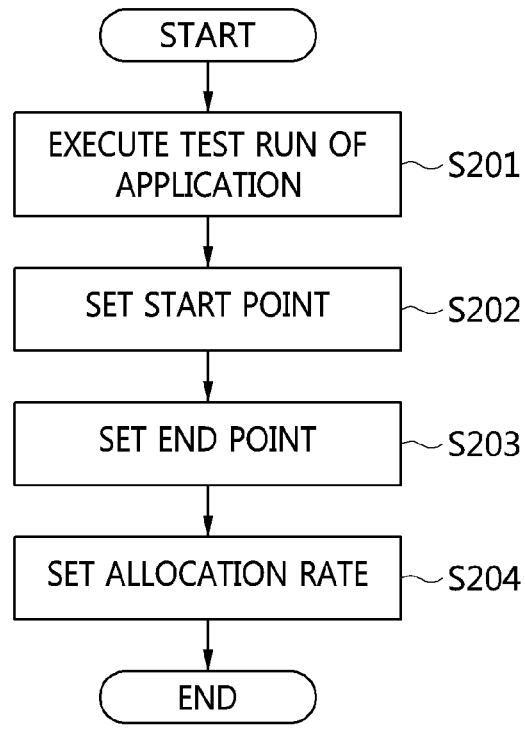
FIG. 3 is a flowchart that shows a method for setting the allocation rate of a parallel-computing accelerator according to an embodiment of the present invention.

FIG. 3 is a flowchart that shows a method for setting the allocation rate of a parallel-computing accelerator according to an embodiment of the present invention.

Referring to FIG. 3, in the method for setting the allocation rate of a parallel-computing accelerator according to an embodiment of the present invention, first, a test run of an application may be performed at step S201.

That is, at step S201, a request to run a deep-learning application or the like may be received, the allocation rate of a parallel-computing accelerator may be set, and a task for running the application may be registered.

Here, at step S201, an initialization process may be requested or performed through the test run of the deep-learning application or the like.

In the method for setting the allocation rate of a parallel-computing accelerator according to an embodiment of the present invention, a start point may be set at step S202.

That is, at step S202, utilization of a parallel-computing accelerator by the application is monitored, and the start point, at which measurement of utilization data to be used for setting the allocation rate of the parallel-computing accelerator for the application is started, may be set using the result of monitoring the utilization.

Here, at step S202, multiple time sections may be set in the monitoring result, whether a steady state is satisfied may be determined using the utilization rates measured in the multiple time sections, and any one point included in the multiple time sections determined to correspond to the steady state may be set as the start point.

Here, at step S202, the mean and standard deviation of the utilization rates may be calculated using the utilization rates measured in each of the multiple time sections, and whether the steady state is satisfied may be determined using the mean and the standard deviation of the utilization rates.

Here, a second time section, which is adjacent to a first time section included in the multiple time sections, may include part of a section that starts from the end point of the first time section.

Here, at step S202, it is determined that the steady state is satisfied in the multiple time sections when the difference between the maximum value and the minimum value of the means calculated in the multiple time sections and the difference between the maximum value and the minimum value of the standard deviations calculated in the multiple time sections are less than preset values.

Also, in the method for setting the allocation rate of a parallel-computing accelerator according to an embodiment of the present invention, an end point may be set at step S203.

That is, at step S203, the end point, at which measurement of the utilization data is finished, may be set based on the monitoring result.

Here, at step S203, multiple time sections may be set in the monitoring result, the mean and standard deviation of the utilization rates may be calculated using the utilization rates measured in each of the multiple time sections, and any one point included in the multiple time sections may be set as the end point using the mean and the standard deviation of the utilization rates.

Here, at step S203, the time spans of the multiple time sections are changed when the difference between the maximum value and the minimum value of the means calculated in the multiple time sections and the difference between the maximum value and the minimum value of the standard deviations calculated in the multiple time sections are equal to or greater than preset values, and the mean and standard deviation of the utilization rates may be calculated using the utilization rates measured in each of the multiple time sections having the changed time spans.

Here, at step S203, any one point included in the multiple time sections may be set as the end point when the difference between the maximum value and the minimum value of the means calculated in the multiple time sections and the difference between the maximum value and the minimum value of the standard deviations calculated in the multiple time sections are less than the preset values.

Also, in the method for setting the allocation rate of a parallel-computing accelerator according to an embodiment of the present invention, the allocate rate may be set at step S204.

That is, at step S204, the allocation rate of the parallel-computing accelerator may be set using the utilization data measured during a time period from the start point to the end point.

Here, at step S204, multiple utilization coverage ranges for ensuring the utilization rate required by the application may be set, the coverage values of the multiple utilization coverage ranges may be calculated based on the utilization data, and any one of the multiple utilization coverage ranges may be selected.

Here, at step S204, multiple coverage ranges for the allocation rate of the parallel-computing accelerator for ensuring the utilization rate required by the application may be set, coverage values for the multiple coverage ranges and the utilization data may be calculated, any one coverage range may be selected based thereon, and the allocation rate corresponding to the selected coverage range may be set as the final allocation rate.

Here, at step S204, the largest utilization rate included in the utilization data included in each of the multiple coverage ranges may be calculated as the coverage value thereof, the coverage values of the multiple coverage ranges may be compared with each other, and the allocation rate corresponding to any one coverage range may be set as the final allocation rate.

Here, at step S204, the first coverage value of the multiple coverage ranges may be compared with the second coverage value thereof, the coverage range corresponding to the second coverage value may be selected when the first coverage value is greater than the second coverage value and the difference therebetween is greater than a preset value, and the allocation rate corresponding to the selected coverage range may be set as the final allocation rate.

Here, at step S204, the first coverage value of the multiple coverage ranges may be compared with the second coverage value thereof, the coverage range corresponding to the first coverage value may be selected when the first coverage value is greater than the second coverage value and the difference therebetween is equal to or less than the preset value, and the allocation rate corresponding to the selected coverage range may be set as the final allocation rate.

Figure 4:
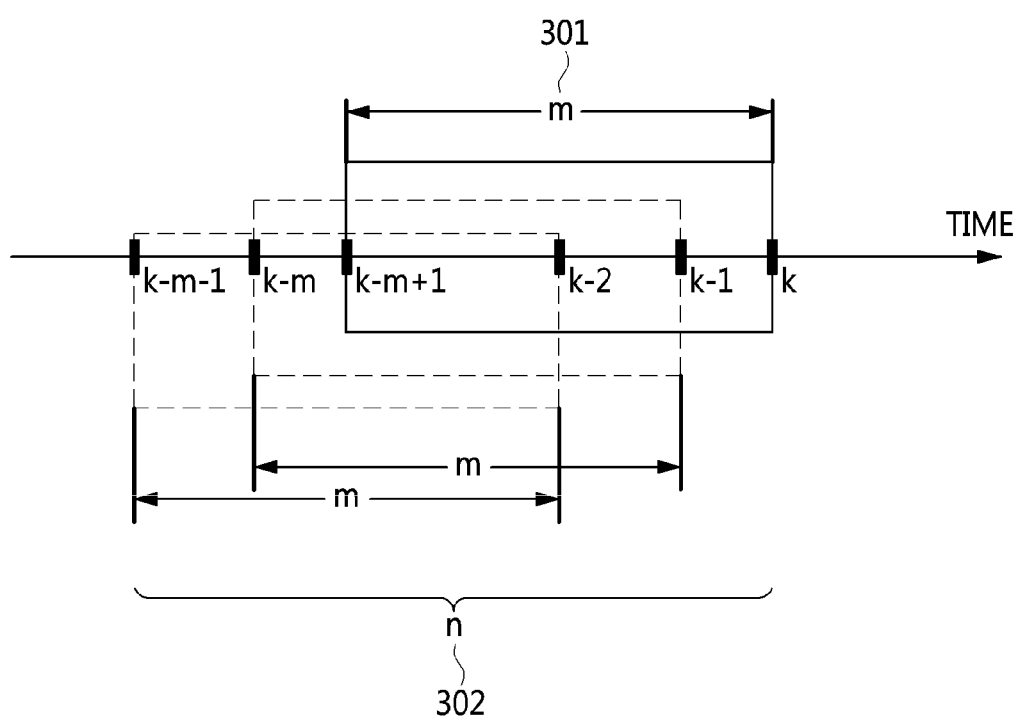
FIG. 4 is a view that shows a sliding-window method for setting a start point according to an embodiment of the present invention.

FIG. 4 is a view that shows a sliding-window method for setting a start point according to an embodiment of the present invention.

The apparatus and method for setting the allocation rate of a parallel-computing accelerator according to an embodiment of the present invention may use a steady-state detection method using a sliding window in order to set a start point. The steady state in the present invention may correspond to a parallel-computing process performed after the process of initializing a deep-learning application. In the process of initializing the deep-learning application, GPU utilization stays at zero at first but rapidly increases and then fluctuates. In the steady-state detection method, whether such fluctuation continues is checked, and when GPU utilization no longer fluctuates, the state in which no fluctuation is observed may be determined to be a steady state.

Referring to FIG. 4, the sliding-window method that is used as the steady-state detection method for setting the start point is illustrated. In FIG. 4, respective coordinate values (k−m−1, k−m, k−m+1, k−2, k−1 and k) indicate GPU utilization rates after measurement is started. Recording of the GPU utilization rate may start when a measured value that is not '0' appears. In FIG. 4, the number (m) of measured values 301 included in a single window is referred to as the size of the window, and the number of windows that are used is n. In FIG. 4, the number (n) of windows 302 is 3. In the sliding-window method used for setting the start point, multiple sliding windows may partially overlap each other.

In the sliding-window method, m and n may change depending on the interval at which measurement is performed. When the interval is short, m and n are increased, and when the interval is long, m and n are decreased. In order to detect a steady state, the mean and standard deviation of the measured values in each window are calculated, and the steady state may be determined using the calculated values.

For example, when the means in the respective windows are $a_1, a_2, a_3, \ldots, a_n$ and when the standard deviations in the respective windows are $\sigma_1, \sigma_2, \sigma_3, \ldots, \sigma_n$, it is assumed that the maximum and minimum values of the means are $a_{max}$ and $a_{min}$ and that the maximum and minimum values of the standard deviations are $\sigma_{max}$ and $\sigma_{min}$. In this case, the state in which the following Equation (1) is satisfied may be determined to be the steady state.

$$\frac{a_{max} - a_{min}}{a_{min}} < t_a \text{ and } \frac{\sigma_{max} - \sigma_{min}}{\sigma_{min}} < t_\sigma \quad (1)$$

(where $t_a$ denotes the threshold value for the mean and $t_\sigma$ denotes the threshold value for the standard deviation)

Here, the threshold values for the mean and the standard deviation may be set depending on the environment. When the conditions in Equation (1) are satisfied, it may be determined that the GPU utilization slightly changes in the windows, and any point within the time spans of the corresponding windows may be set as the point at which the utilization data starts to be measured.

Also, in the apparatus and method for setting the allocation rate of a parallel-computing accelerator according to an embodiment of the present invention, after measurement of GPU utilization is started at the start point, it is necessary to set the end point, at which the measurement is finished. When the end point is set, whether one or more iterations of the repeated parallel-computing process are included in the measured data may be determined. When the end point is set, recording the GPU utilization is stopped at the end point, and the test run may be stopped.

Figure 5:
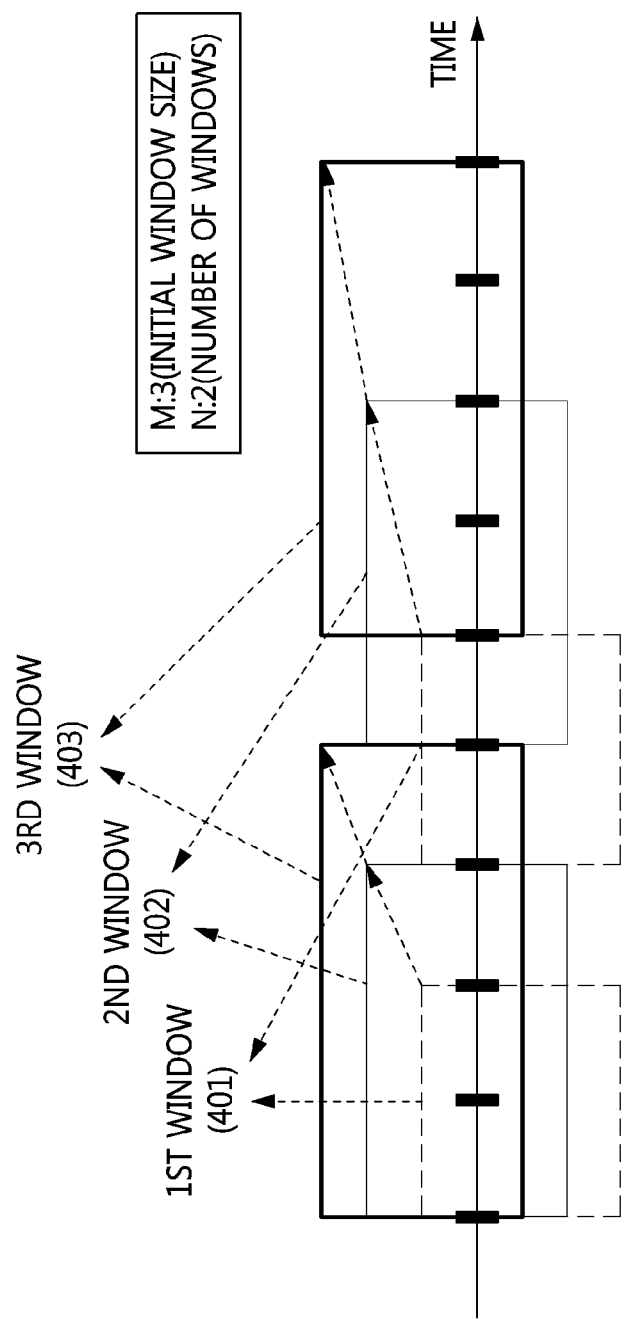
FIG. 5 is a view that shows an extended window method for setting an end point according to an embodiment of the present invention.

FIG. 5 is a view that shows an extended window method for setting an end point according to an embodiment of the present invention.

Referring to FIG. 5, in order to set an end point, the present invention may use an extended window method in which windows are extended without overlapping each other. According to the extended window method, it may be determined that utilization measured for at least one period is included in a single window when the difference in variability of measured data included in n windows is equal to or less than a threshold.

In the extended window method used for setting the end point, the time spans of windows do not overlap each other, and the size thereof may be extended, unlike sliding windows used for setting a start point. That is, when it is determined that the condition for setting the end point is not satisfied, a determination may be made again after the size or the time span of a window is increased by a predetermined value such that windows do not overlap each other. In FIG. 5, the number of windows (n) is 2, and the initial window size (m) is 3. The first window 401 has a size of 3, and the first window 401 may be changed to the second window 402 when it does not satisfy the condition. Then, the condition is checked once again, and when the condition for setting the end point is not satisfied, the second window 402 may be changed to the third window 403. The windows increase their sizes by 1 without overlapping each other, and the mean and the standard deviation of measured values in each window are calculated. The end point may be set using the calculated values. The condition for setting the end point may be determined using Equation (1), as in the method of setting the start point (but the values of $t_a$ and $t_\sigma$, which are the threshold values for the mean and the standard deviation, may be different from those used for setting the start point).

When the end point is set, the utilization data for setting the GPU allocation rate is prepared. The GPU utilization is represented as a percentage, and the allocation rate may also be calculated as a percentage.

Figure 6:
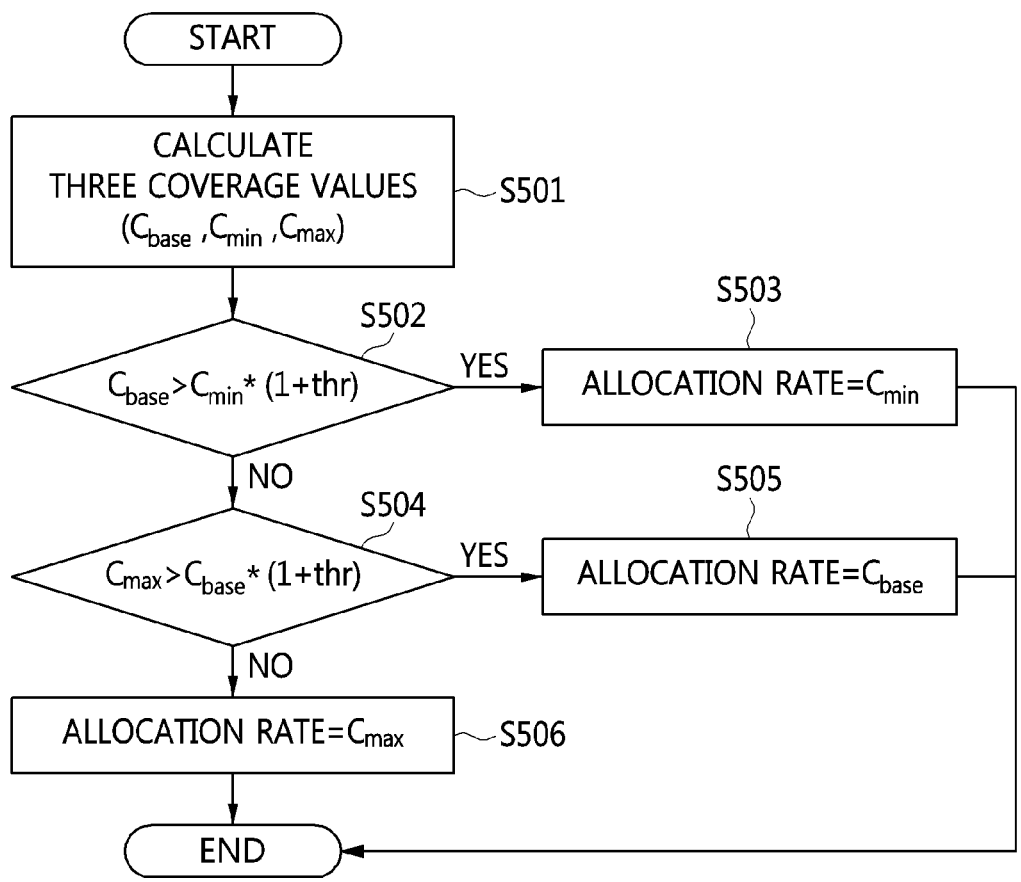
FIG. 6 is a flowchart that specifically shows an example of the step of setting an allocation rate illustrated in FIG. 3.

FIG. 6 is a flowchart that specifically shows an example of the step of setting the allocation rate illustrated in FIG. 3.

Referring to FIG. 6, in the method for setting the allocation rate of a parallel-computing accelerator according to an embodiment of the present invention, first, a coverage value may be calculated at step S501.

That is, at step S501, with respect to GPU utilization required by an application, values for three coverage ranges are calculated, and the differences therebetween are compared, whereby the most efficient value may be selected. In an embodiment of the present invention, three coverage ranges are set, but n coverage ranges may be used, without limitation thereto.

For example, allocation rates may be set as follows for the three coverage ranges set in the present invention.

the maximum coverage range ($C_{max}$): 100% coverage of utilization data the basic coverage range ($C_{base}$): 90% coverage of utilization data the minimum coverage range ($C_{min}$): 80% coverage of utilization data (the coverage percentage in each coverage range may be changed).

Here, when the following utilization data (%) is provided, each coverage value may be calculated as follows:

utilization data: {10, 20, 10, 30, 40, 50, 60, 50, 10, 90}

$C_{max}$=90% (all of the ten pieces of data are covered)

$C_{base}$=60% (nine pieces of data are covered, excluding 90%)

$C_{min}$=50% (eight pieces of data are covered, excluding 90% and 60%)

Describing the three coverage ranges assumed in the present embodiment, $C_{max}$ is the GPU allocation rate that enables the deep-learning application to achieve the maximum performance, $C_{base}$ is the GPU allocation rate capable of preventing the system efficiency from greatly decreasing, and $C_{min}$ is the GPU utilization for ensuring the minimum acceptable level of performance even if the system efficiency decreases.

That is, because the maximum coverage range $C_{max}$ covers 100% of the utilization data, it may include all of the ten pieces of utilization data {10, 20, 10, 30, 40, 50, 60, 50, 10, 90}, and 90%, which is the maximum utilization, may be calculated as the coverage value thereof.

Also, because the basic coverage range $C_{base}$ covers 90% of the utilization data, it may include nine pieces of data, among the ten pieces of utilization data {10, 20, 10, 30, 40, 50, 60, 50, 10, 90}. That is, the nine pieces of utilization data, excluding 90%, which is the highest utilization, may be included.

Accordingly, the coverage value of the basic coverage range $C_{base}$ may be calculated to be 60%, which is the highest utilization, among the remaining nine pieces of utilization data.

Also, because the minimum coverage range $C_{min}$ covers 80% of the utilization, it may include eight pieces of data, among the ten pieces of utilization data {10, 20, 10, 30, 40, 50, 60, 50, 10, 90}, and the eight pieces of utilization data, excluding 90% and 60%, which are the highest utilization and the second-highest utilization, may be included therein.

Accordingly, the coverage value of the minimum coverage range $C_{min}$ may be calculated to be 50%, which is the highest utilization, among the remaining eight pieces of utilization data.

Here, in the method for setting the allocation rate of a parallel-computing accelerator according to an embodiment of the present invention, the final allocation rate may be set using the coverage values calculated in the above example in consideration of performance and economic efficiency.

That is, at step S501, three coverage values may be calculated based on the utilization data.

Also, at step S502, the coverage values may be compared.

That is, at step S502, when it is determined that the value of $C_{base}$ exceeds the value of $C_{min}$ by the threshold thr, the value of $C_{min}$ may be set as the final allocation rate at step S503.

Here, at step S502, it is determined that $C_{base}$ is unprofitable when the value of $C_{base}$ is much greater than the value of $C_{min}$. Accordingly, the value of $C_{min}$ may be set as the final allocation rate at step S503.

Also, at step S502, when the difference between the value of $C_{base}$ and the value of $C_{min}$ is determined to be equal to or less than the threshold thr, the value of $C_{base}$ may be compared with the value of $C_{max}$ at step S504.

At step S504, when it is determined that the value of $C_{max}$ exceeds the value of $C_{base}$ by the threshold thr, the value of $C_{base}$ may be set as the final allocation rate at step S505.

Here, at step 504, it is determined that $C_{max}$ is unprofitable when the value of $C_{max}$ is much greater than the value of $C_{base}$. Accordingly, the value of $C_{base}$ may be set as the final allocation rate at step 505.

Also, at step S504, when the difference between the value of $C_{max}$ and the value of $C_{base}$ is determined to be equal to or less than the threshold thr, the value of $C_{max}$ may be set as the final allocation rate at step S506.

Here, the threshold value may be set depending on a policy for ensuring application performance and system efficiency.

The allocation-rate-setting method proposed by the present invention is a method for setting the allocation rate in consideration of both the performance of a deep-learning application and system efficiency.

The GPU allocation rate for running a deep-learning application, which is set based on the above-described three methods, may be set through a single test, but may be set using an average value acquired by performing the test multiple times in consideration of errors that may occur in the test.

Also, the GPU allocation rate set in the present invention may be used when a scheduler schedules applications running on a GPU for a long time, including a deep-learning application, in a cloud service environment based on GPUs.

Figure 7:
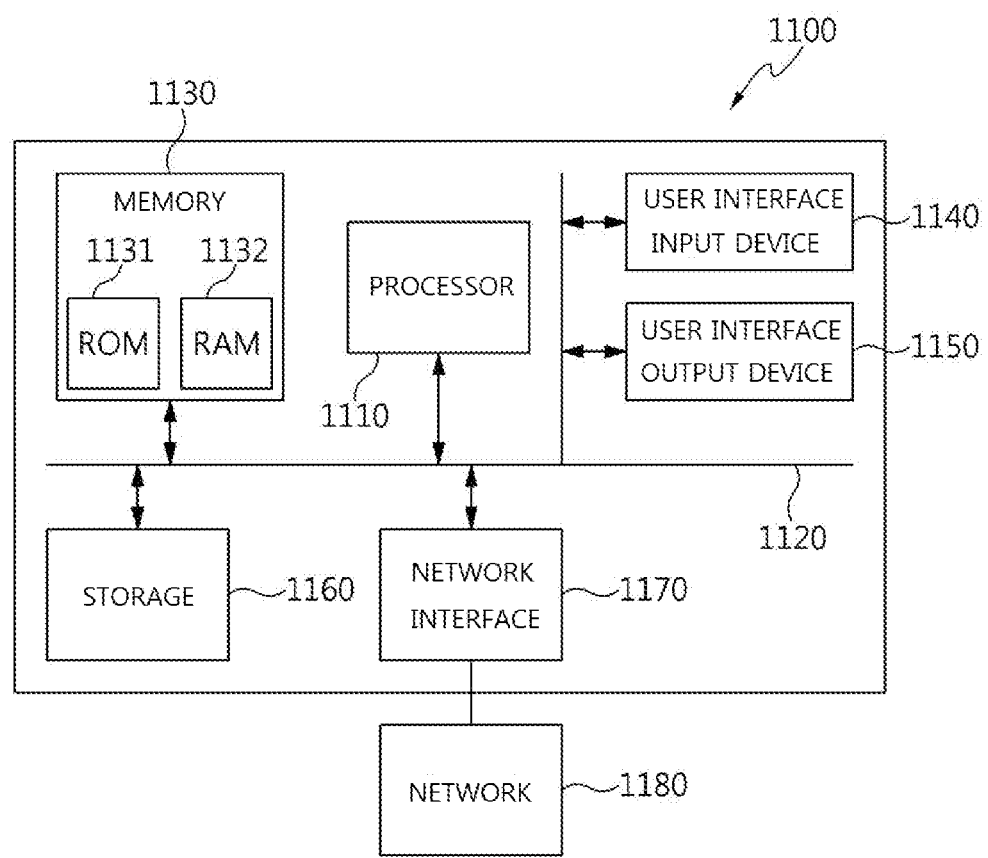
FIG. 7 is a view that shows a computer system according to an embodiment of the present invention.

FIG. 7 is a view that shows a computer system according to an embodiment of the present invention.

Referring to FIG. 7, the GPU computing node 10 and the apparatus 100 for setting the allocation rate of a parallel-computing accelerator according to an embodiment of the present invention may be implemented in a computer system 1100 including a computer-readable recording medium. As described in FIG. 7, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

Here, the apparatus 100 for setting the allocation rate of a parallel-computing accelerator according to an embodiment of the present invention includes one or more processors 1110 and memory 1130 for storing at least one program executed by the one or more processors 1110. The at least one program may monitor the utilization of the parallel-computing accelerator by an application, set a start point at which measurement of utilization data to be used for setting the allocation rate of the parallel-computing accelerator is started using the result of monitoring the utilization, set an end point at which the measurement of the utilization data is finished using the monitoring result, and set the allocation rate of the parallel-computing accelerator using the utilization data measured during a period from the start point to the end point.

Here, the at least one program may set multiple time sections in the monitoring result, determine whether a steady state is satisfied using the utilization rates measured in the multiple time sections, and set any one point included in the multiple time sections determined to correspond to the steady state as the start point.

Here, the at least one program may calculate the mean and the standard deviation of the utilization rates using the utilization rates measured in each of the multiple time sections and determine whether the steady state is satisfied using the mean and the standard deviation of the utilization rates.

Here, a second time section, which is adjacent to a first time section included in the multiple time sections, may include part of a section starting from the end point of the first time section.

Here, the at least one program may determine that the steady state is satisfied in the multiple time sections when the difference between the maximum value and the minimum value of the means calculated in the multiple time sections and the difference between the maximum value and the minimum value of the standard deviations calculated in the multiple time sections are less than preset values.

Here, the at least one program may set multiple time sections in the monitoring result, calculate the mean and standard deviation of the utilization rates using the utilization rates measured in each of the multiple time sections, and set any one point included in the multiple time sections as the end point using the mean and standard deviation of the utilization rates.

Here, the at least one program may change the time spans of the multiple time sections when the difference between the maximum value and the minimum value of the means calculated in the multiple time sections and the difference between the maximum value and the minimum value of the standard deviations calculated in the multiple time sections are equal to or greater than preset values, and may calculate the mean and standard deviation of the utilization rates using the utilization rates measured in each of the multiple time sections having the changed time spans.

Here, the at least one program may set any one point included in the multiple time sections as the end point when the difference between the maximum value and the minimum value of the means calculated in the multiple time sections and the difference between the maximum value and the minimum value of the standard deviations calculated in the multiple time sections are less than the preset values.

Here, the at least one program may set multiple coverage ranges for the allocation rate of the parallel-computing accelerator in order to ensure the utilization rate required by the application, select any one of the coverage ranges by calculating the coverage values for the multiple coverage ranges and the utilization data, and set the allocation rate corresponding to the selected coverage range as the final allocation rate.

Here, the at least one program may calculate the largest utilization rate included in the utilization data included in each of the multiple coverage ranges as the coverage value thereof and compare the coverage values of the multiple coverage ranges with each other, thereby selecting the allocation rate corresponding to any one coverage range as the final allocation rate.

Here, the at least one program may compare the first coverage value of the multiple coverage ranges with the second coverage value thereof, select the coverage range corresponding to the second coverage value when the first coverage value is greater than the second coverage value and the difference therebetween is greater than a preset value, and set the allocation rate corresponding to the selected coverage range as the final allocation rate.

Here, the at least one program may compare the first coverage value of the multiple coverage ranges with the second coverage value thereof, select the coverage range corresponding to the first coverage value when the first coverage value is greater than the second coverage value and the difference therebetween is equal to or less than the preset value, and set the allocation rate corresponding to the selected coverage range as the final allocation rate.

The present invention may set the allocation rate of a parallel-computing accelerator for providing an application service in a cloud service environment.

Also, the present invention may predict the usage pattern of a parallel-computing accelerator for running an application and detect the total system load.

As described above, the apparatus and method for setting the allocation rate of a parallel-computing accelerator according to the present invention are not limitedly applied to the configurations and operations of the above-described embodiments, but all or some of the embodiments may be selectively combined and configured, so that the embodiments may be modified in various ways.

What is claimed is:

1. A method for setting an allocation rate of a parallel-computing accelerator, performed by an apparatus for setting the allocation rate of the parallel-computing accelerator, comprising:
    monitoring a utilization rate of the parallel-computing accelerator by an application and setting a start point, at which measurement of utilization data to be used in order to set the allocation rate of the parallel-computing accelerator for the application is started, using a result of monitoring the utilization rate;
    setting an end point, at which the measurement of the utilization data is finished, based on the monitoring result; and
    setting the allocation rate of the parallel-computing accelerator using the utilization data measured during a time period from the start point to the end point.

2. The method of claim 1, wherein setting the start point is configured to:
    set multiple time sections in the monitoring result;
    determine whether a steady state is satisfied using utilization rates measured in the multiple time sections; and
    set any one point included in the multiple time sections determined to correspond to the steady state as the start point.

3. The method of claim 2, wherein setting the start point is configured to calculate a mean and a standard deviation of the utilization rates using the utilization rates measured in each of the multiple time sections and to determine whether the steady state is satisfied using the mean and the standard deviation of the utilization rates.

4. The method of claim 3, wherein:
    a second time section is adjacent to a first time section included in the multiple time sections, and
    the second time section includes part of a section starting from an end point of the first time section.

5. The method of claim 4, wherein setting the start point is configured to determine that the steady state is satisfied in the multiple time sections when a difference between a maximum value and a minimum value of the means calculated in the multiple time sections and a difference between a maximum value and a minimum value of the standard deviations calculated in the multiple time sections are less than preset values.

6. The method of claim 1, wherein setting the end point is configured to:
    set multiple time sections in the monitoring result;
    calculate a mean and a standard deviation of the utilization rates using the utilization rates measured in each of the multiple time sections; and
    set any one point included in the multiple time sections as the end point using the mean and the standard deviation of the utilization rates.

7. The method of claim 6, wherein setting the end point is configured to:
    change time spans of the multiple time sections when a difference between a maximum value and a minimum value of the means calculated in the multiple time sections and a difference between a maximum value and a minimum value of the standard deviations calculated in the multiple time sections are equal to or greater than preset values; and
    calculate a mean and a standard deviation of the utilization rates using the utilization rates measured in each of the multiple time sections having the changed time spans.

8. The method of claim 7, wherein setting the end point is configured to set any one point included in the multiple time sections as the end point when the difference between the maximum value and the minimum value of the means calculated in the multiple time sections and the difference between the maximum value and the minimum value of the standard deviations calculated in the multiple time sections are less than the preset values.

9. The method of claim 1, wherein setting the allocation rate is configured to:
    set multiple utilization coverage ranges for ensuring a utilization rate required by the application;
    calculate coverage values of the multiple utilization coverage ranges based on the utilization data; and
    select any one of the multiple utilization coverage ranges.

10. The method of claim 1, wherein setting the allocation rate is configured to:
    set multiple coverage ranges for the allocation rate of the parallel-computing accelerator in order to ensure a utilization rate required by the application;
    select any one of the coverage ranges by calculating coverage values for the multiple coverage ranges and the utilization data; and
    set an allocation rate corresponding to the selected coverage range as a final allocation rate.

11. The method of claim 10, wherein setting the allocation rate is configured to:

calculate a largest utilization rate included in utilization data included in each of the multiple coverage ranges as the coverage value of the coverage range;

compare the coverage values of the multiple coverage ranges with each other; and set the allocation rate corresponding to any one of the multiple coverage ranges as the final allocation rate.

12. The method of claim 11, wherein setting the allocation rate is configured to:

compare a first coverage value of the multiple coverage ranges with a second coverage value thereof;

select a coverage range corresponding to the second coverage value when the first coverage value is greater than the second coverage value and a difference therebetween is greater than a preset value; and set an allocation rate corresponding to the selected coverage range as the final allocation rate.

13. The method of claim 12, wherein setting the allocation rate is configured to:

compare the first coverage value of the multiple coverage ranges with the second coverage value thereof;

select a coverage range corresponding to the first coverage value when the first coverage value is greater than the second coverage value and a difference therebetween is equal to or less than the preset value; and set an allocation rate corresponding to the selected coverage range as the final allocation rate.

14. An apparatus for setting an allocation rate of a parallel-computing accelerator, comprising:

one or more processors; and executable memory for storing at least one program executed by the one or more processors, wherein the at least one program is configured to monitor a utilization rate of the parallel-computing accelerator by an application, to set a start point, at which measurement of utilization data to be used in order to set the allocation rate of the parallel-computing accelerator for the application is started, using a result of monitoring the utilization rate, to set an end point, at which the measurement of the utilization data is finished, based on the monitoring result, and to set the allocation rate of the parallel-computing accelerator using the utilization data measured during a time period from the start point to the end point.

15. The apparatus of claim 14, wherein the at least one program sets multiple time sections in the monitoring result, determines whether a steady state is satisfied using utilization rates measured in the multiple time sections, and sets any one point included in the multiple time sections determined to correspond to the steady state as the start point.

16. The apparatus of claim 14, wherein the at least one program sets multiple time sections in the monitoring result, calculates a mean and a standard deviation of the utilization rates using the utilization rates measured in each of the multiple time sections, and sets any one point included in the multiple time sections as the end point using the mean and the standard deviation of the utilization rates.

17. The apparatus of claim 14, wherein the at least one program sets multiple coverage ranges for the allocation rate of the parallel-computing accelerator for ensuring a utilization rate required by the application, selects any one of the multiple coverage ranges by calculating coverage values for the multiple coverage ranges and the utilization data, and sets an allocation rate corresponding to the selected coverage range as a final allocation rate.

18. The apparatus of claim 17, wherein the at least one program calculates a largest utilization rate included in the utilization data included in each of the multiple coverage ranges as the coverage value thereof, compares the coverage values of the multiple coverage ranges with each other, and sets the allocation rate corresponding to the any one of the multiple coverage ranges as the final allocation rate.

19. The apparatus of claim 18, wherein the at least one program compares a first coverage value of the multiple coverage ranges with a second coverage value thereof, selects a coverage range corresponding to the second coverage value when the first coverage value is greater than the second coverage value and a difference therebetween is greater than a preset value, and sets an allocation rate corresponding to the selected coverage range as the final allocation rate.

20. The apparatus of claim 19, wherein the at least one program compares the first coverage value of the multiple coverage ranges with the second coverage value thereof, selects a coverage range corresponding to the first coverage value when the first coverage value is greater than the second coverage value and a difference therebetween is equal to or less than the preset value, and sets an allocation rate corresponding to the selected coverage range as the final allocation rate.

* * * * *